(12) United States Patent
Barimani et al.

(10) Patent No.: US 10,968,575 B2
(45) Date of Patent: Apr. 6, 2021

(54) EARTH WORKING MACHINE HAVING AN INSERTABLE OPERATING SEAT

(71) Applicant: Wirtgen GmbH, Windhagen (DE)

(72) Inventors: Cyrus Barimani, Königswinter (DE); Stephan Drumm, Ockenfels (DE); Alexander Körtgen, Bonn (DE)

(73) Assignee: Wirtgen GmbH

( * ) Notice: Subject to any disclaimer, the term of this patent is extended or adjusted under 35 U.S.C. 154(b) by 139 days.

(21) Appl. No.: 16/243,445

(22) Filed: Jan. 9, 2019

(65) Prior Publication Data
US 2019/0249378 A1  Aug. 15, 2019

(30) Foreign Application Priority Data

Feb. 9, 2018  (DE) .......................... 102018202074.4

(51) Int. Cl.
*E01C 23/088* (2006.01)
*E01C 23/12* (2006.01)
(Continued)

(52) U.S. Cl.
CPC .......... *E01C 23/088* (2013.01); *E01C 23/127* (2013.01); *B60N 2/012* (2013.01);
(Continued)

(58) Field of Classification Search
CPC .. E01C 2301/40; E01C 23/088; E01C 23/127; E01C 2301/00; E01C 2301/30;
(Continued)

(56) References Cited

U.S. PATENT DOCUMENTS 3,636,832 A * 1/1972 Schrimper .......... E01C 19/4853
404/84.2
4,977,848 A * 12/1990 Currey .................... B63B 29/04
114/363
(Continued)

FOREIGN PATENT DOCUMENTS

CN       101641482 A      2/2010
CN       203229862 U     10/2013
(Continued)

OTHER PUBLICATIONS

Office action dated Sep. 26, 2018 in corresponding German application 10 2018 202 074.4 (not prior art).
(Continued)

*Primary Examiner* — David J Bagnell
*Assistant Examiner* — Michael A Goodwin
(74) *Attorney, Agent, or Firm* — Lucian Wayne Beavers; Patterson Intellectual Property Law, PC

(57) ABSTRACT

An earth working machine (10), for example a road milling machine (10), recycler, stabilizer, or surface miner, having a propelling unit (22) and a machine frame (12) carried by the propelling unit (22), comprises a working apparatus (32) for earth working; an operator's platform (24), having an operating console (26) for controlling at least one functional device (32, 39) of the earth working machine (10), being provided on the machine frame (12). Provision is made according to the present invention that the earth working machine (10) comprises, in the region of the operator's platform (24), a seat mount arrangement (66) that is embodied to be brought into releasable mounting engagement with a counterpart mount arrangement (76) of an operating seat (62, 64).

19 Claims, 3 Drawing Sheets

(51) Int. Cl.
  *E02F 9/16* (2006.01)
  *B60N 2/01* (2006.01)
  *B60N 2/24* (2006.01)
  *B60N 2/30* (2006.01)
  *B60N 2/015* (2006.01)
  *E21C 25/10* (2006.01)
  *E21C 35/00* (2006.01)

(52) U.S. Cl.
  CPC ............ *B60N 2/01508* (2013.01); *B60N 2/24* (2013.01); *B60N 2/3097* (2013.01); *E01C 2301/30* (2013.01); *E01C 2301/40* (2013.01); *E02F 9/166* (2013.01); *E21C 25/10* (2013.01); *E21C 35/00* (2013.01)

(58) Field of Classification Search
  CPC .......... E21C 47/00–47/10; E21C 25/10; E21C 35/00; E02F 9/16; E02F 9/166; B63B 29/06; B63B 29/00; B63B 29/04; B63B 2029/043
  USPC ........................................................ 248/599
  See application file for complete search history.

(56) References Cited

U.S. PATENT DOCUMENTS

| | | | | |
|---|---|---|---|---|
| 5,044,299 A * | 9/1991 | Frank | ...................... | B63B 29/06 114/363 |
| 5,065,967 A * | 11/1991 | Murakami | .............. | E02F 9/166 248/161 |
| 5,833,385 A * | 11/1998 | Carnahan | ................ | B63B 29/06 403/377 |
| 6,189,573 B1 | 2/2001 | Ziehm | | |
| 7,013,831 B1 * | 3/2006 | Garelick | ................ | B63B 29/06 114/343 |
| 9,803,798 B1 * | 10/2017 | Rockhill | .................. | A47C 3/20 |
| 2010/0117275 A1 * | 5/2010 | Nakamura | .............. | E02F 9/166 267/133 |
| 2015/0217664 A1 * | 8/2015 | Levin | ...................... | B60N 2/24 180/329 |
| 2015/0252553 A1 * | 9/2015 | Kimura | .................. | B62D 27/06 296/190.04 |
| 2016/0152165 A1 * | 6/2016 | Vaudt | .................... | B60N 2/682 297/248 |
| 2017/0030033 A1 * | 2/2017 | Emme | .................. | E01C 23/088 |
| 2017/0198445 A1 | 7/2017 | Oettinger | | |
| 2018/0187383 A1 * | 7/2018 | Anheier | .................. | E01C 19/48 |

FOREIGN PATENT DOCUMENTS

| | | |
|---|---|---|
| CN | 107638257 A | 1/2018 |
| DE | 891507 C | 9/1953 |
| EP | 2511161 A2 | 10/2012 |
| WO | 2015180774 A1 | 12/2015 |

OTHER PUBLICATIONS

EPO Office Action for corresponding EP 19 15 0563, dated Jul. 11, 2019, 9 pages (not prior art).
China Office Action on corresponding 201910022156.2, dated Feb. 8, 2021, 9 pages (not prior art).

\* cited by examiner

EARTH WORKING MACHINE HAVING AN INSERTABLE OPERATING SEAT

BACKGROUND OF THE INVENTION

1. Field of the Invention

The present invention relates to an earth working machine, for example a road milling machine, recycler, stabilizer, or surface miner, having a propelling unit and a machine frame carried by the propelling unit; the earth working machine comprising a working apparatus for earth working; and an operator's platform, having an operating console for controlling at least one functional device of the earth working machine, being provided on the machine frame.

2. Description of the Prior Art

A known earth working machine according to the present invention is, for example, a large road milling machine having the designation "W 210i". This is a so-called "cold milling machine" whose working apparatus, in the form of a rotating milling drum fitted with milling bits, removes a substrate located below it from the surface down, with no prior heating of the substrate. As is usual with a large milling machine, the milling drum is located approximately at the longitudinal center between a front and a rear partial propelling unit of the earth working machine.

In the interest of greater comfort for the machine operator, a driver's seat is located on the operator's platform of the known road milling machine. The driver's seat is arranged at an ergonomically advantageous location close to the idle side of the machine. The driver's seat cannot be removed from its attachment location, and cannot be displaced except for a height adjustment. The driver's seat can be rotated at its attachment location around an axis which is parallel to the yaw axis of the earth working machine and along which the height adjustment also occurs.

When the machine operator prefers to working standing up, the driver's seat provided at a fixed attachment location decreases the machine operator's movement space. This is noteworthy in particular because experience indicates that machine operators work standing up when they are performing very difficult milling tasks with tight working tolerances. Machine operators then work standing up so that they can look at the milling point from above from different points on the operator's platform in as rapid a sequence as possible, and can thereby control the earth working machine as accurately as possible.

SUMMARY OF THE INVENTION

The object of the present invention is therefore to describe an earth working machine of the kind recited previously which in principle leaves to the machine operator the choice of whether to work seated or standing and which furnishes to the machine operator, when he or she decides to work standing up, the largest possible movement space in the region of the operating console that he or she needs to manipulate for machine operation.

This object is achieved according to the present invention by an earth working machine as described previously which additionally comprises, in the region of the operator's platform, a seat mount arrangement that is embodied to be brought into releasable mounting engagement with a counterpart mount arrangement of an operating seat.

Thanks to the provision of the seat mount arrangement in the region of the operator's platform, the machine operator can selectably bring an operating seat, which is equipped with a counterpart mount arrangement that matches the seat mount arrangement, into releasable mounting engagement with the seat mount arrangement (in which case the machine operator has a capability for sitting on the driver's seat), or the machine operator leaves the seat mount arrangement unused, i.e. he or she does not establish a mounting engagement with the counterpart mount arrangement of an operating seat and thus has a movement space that is defined only by the size of the operator's platform and is not limited by a volume occupied by an operating seat.

For clarification: the object of the present invention is achieved by an earth working machine that comprises only the aforementioned seat mount arrangement, with no need for the earth working machine also necessarily to comprise an operating seat. Merely providing the seat mount arrangement on the operator's platform already creates the ability for the machine operator to decide to work selectably with or without an operating seat. The operating seat on the earth working machine is therefore not itself a necessary part of achieving the aforesaid object, but merely a preferred refinement of the invention.

To ensure that a secure and stable, but nevertheless releasable, mounting engagement can be established between the seat mount arrangement of the earth working machine and a matching counterpart mount arrangement of an operating seat, the seat mount arrangement can comprise a mount arrangement having a mount configuration that is embodied for mounting engagement with a counterpart mount configuration of an operating seat. The mounting engagement is "releasable" for purposes of the present Application if it is releasable without destroying the components involved in the mounting engagement and with no engagement of tools onto connecting components such as bolts, nuts, and the like.

The working apparatus of the earth working machine, especially when it is a rotating milling drum having a plurality of milling bits that sequentially come into impacting engagement with the substrate being processed, is often a source of a vibrational excitation that can cause the machine frame to vibrate. An undesired vibrational excitation of an operating seat that may be used during earth working can be prevented by the fact that the mount arrangement is connected to the machine frame movably relative to the machine frame, with interposition of a damping arrangement.

In principle, provision can be made that the damping arrangement is connected directly to the machine frame. For example, in the context of preferred use of an elastomeric damping arrangement, the damping arrangement can be adhesively bonded or vulcanized directly onto a component of the machine frame. Because of a greater design freedom resulting therefrom, however, it is preferred that the seat mount arrangement comprise a fastening arrangement that is fastened onto the machine frame, the seat mount arrangement comprising the damping arrangement that connects the mount arrangement to the fastening arrangement movably relative to the fastening arrangement. The seat mount arrangement, constituting an independently manipulatable arrangement equivalent to a preinstalled subassembly, can then be arranged at any suitable location on the machine frame, the mount arrangement being decoupled in terms of vibration from the machine frame as a result of the damping arrangement already present in the seat mount arrangement.

The mount arrangement is preferably manufactured from metal, particularly preferably from steel. Also preferably, the fastening arrangement is manufactured from metal, for example from steel or aluminum. The damping arrangement is preferably an elastomeric damping arrangement, for example a rubber component, that damps as a result of internal friction. In order to obtain a damping of the mount arrangement by the damping arrangement which is as homogeneous as possible on all sides, the damping arrangement preferably surrounds the mount arrangement completely along a circumferential path. To allow the damping arrangement in turn to be coupled to the machine frame in as stable and directionally independently homogeneous a manner as possible, the fastening arrangement preferably surrounds the damping arrangement completely along a circumferential path.

Alternatively, provision can also be made that the damping arrangement is specifically intended to furnish not homogeneous damping, but instead different damping values in different motion directions. For example, it is conceivable to provide different damping values for relative motions between the mount arrangement and fastening arrangement along the pitch axis than for relative motions along the roll axis. For that purpose the damping arrangement can comprise, in different regions, different materials having different damping properties, and/or it can comprise, in different regions, different numbers of cavities and/or cavities of different sizes.

In order to furnish a sufficient mounting length for mounting engagement, the mount configuration preferably extends along a virtual mount axis and around the mount axis. The mount axis is then a reference axis for the aforementioned circumferential path. The mount configuration can be embodied in any manner in order to establish a secure but releasable mounting engagement with the operating-seat-side counterpart mount configuration. For example, the mount configuration can comprise a thread that can be thread-connected to the counterpart mount configuration. The thread axis is then the virtual mount axis. A mounting engagement of equivalent operating reliability can be established substantially more quickly, however, if the mount configuration tapers along the mount axis and is preferably free of ribs and/or projections in an axial direction along the mount axis. The reason is that mounting engagement can then be achieved by simply placing a corresponding counterpart mount configuration, tapering in complementary fashion to the mount configuration, into or onto the mount configuration. Most importantly, the mounting engagement can then be released very quickly, since as a result of the tapering embodiment of the configurations (mount configuration and counterpart mount configuration), an abutting mounting engagement can be released by even a small axial relative motion between them. In the interest of simple machining and manufacturing, the mount configuration is preferably embodied to taper conically. In order to achieve stable mounting, the semi-aperture angle of the taper of the mount configuration is smaller than 45°. The mount configuration preferably constitutes the inner surface of a negatively conical sleeve-like mount arrangement.

Also preferably, the mount configuration, or at least a portion thereof involved in mounting engagement thereof, is rotationally symmetrical, with the mount axis constituting the rotational symmetry axis. The reason is that upon establishment of mounting engagement, an orientation of the mount configuration and counterpart mount configuration relative to one another around the mount axis is then immaterial.

In order to allow the machine operator selectably to use an operating seat and omit such use during a single operating phase, it is advantageous if the earth working machine comprises a stowage mount arrangement that is embodied to be brought into releasable mounting engagement with a counterpart mount arrangement of an operating seat. An operating seat that may be carried on the machine can then be in mounting engagement with the stowage mount arrangement while not being used. In order to put the operating seat into service, its mounting engagement with the stowage mount arrangement is released and is established with the seat mount arrangement of the machine. When the operating seat is not being used, a mounting engagement that exists with the seat mount arrangement can be released and can be established with the stowage mount arrangement. In order to allow an operating seat to be activated and deactivated as quickly as possible as a seating opportunity on the operator's platform, the stowage mount arrangement is also preferably arranged in the region of the operator's platform. The stowage mount arrangement can be located closer to the transverse center of the operator's platform, where the machine operator seldom or never stands during earth working, than to its lateral edges, so that the operating seat stowed there does not inconvenience or limit him or her during earth working. The seat mount arrangement, however, is preferably located along a pitch axis of the machine closer to the edges, where the machine operator will predominantly stand during earth working, rather than at the transverse center of the operator's platform, especially in the region of the idle side of the machine up to which the effective working range of the working apparatus extends—with the exception of a safety zone for the arrangement of unavoidable safety panels—along the pitch axis of the machine.

The operator's platform can comprise several seat mount arrangements in order to offer the machine operator the capability of placing an operating seat at different locations and/or in order to take into account ergonomically different body sizes of machine operators.

The stowage mount arrangement can comprise, analogously to the seat mount arrangement, a stowage arrangement having a stowage configuration that is embodied for mounting engagement with a counterpart mounting configuration of an operating seat. Because a machine operator does not use an operating seat as a seating opportunity when the operating seat is in mounting engagement with the stowage mount arrangement, the stowage arrangement can be connected rigidly to the machine frame. A damping arrangement that is preferably provided on the seat mount arrangement can therefore be omitted from the stowage mount arrangement.

In order to enhance operating reliability and avoid unnecessary operating errors, the stowage configuration and the mount configuration can each comprise a configuration portion of identical conformation embodied for mounting engagement with the counterpart mount configuration. The machine operator then always needs to perform the same action in order to establish an abutting engagement with the counterpart mount configuration, for example an operation of simply inserting or removing the counterpart mount configuration respectively into or from the mount configuration or the stowage configuration, in order to bring about a corresponding mounting engagement.

So that the machine operator is not affected by the vibrational excitation of the working apparatus during earth working, the operator's platform preferably comprises an operator's platform floor that is vibrationally decoupled from the machine frame by interposition of a damping structure. The operator's platform floor can comprise a seat mount opening which passes through the operator's platform floor and which is penetrated by the mount arrangement and/or through which the mount configuration is reachable from the operator's platform. The seat mount arrangement can thus be fastened directly onto the machine frame and can nevertheless be reachable from the operator's platform. An operator's-platform-side longitudinal end of the mount arrangement is preferably arranged flush with or below an operator's platform floor surface in order to eliminate tripping hazards on the operator's platform. Alternatively or additionally, the operator's platform floor can comprise a stowage mount opening which passes through the operator's platform floor and which is penetrated by the stowage arrangement and/or through which the stowage configuration is reachable from the operator's platform. The mount arrangement and/or the stowage arrangement are therefore preferably vibrationally decoupled from the machine frame independently of the operator's platform floor.

Even if the earth working machine comprises, in order to achieve the object recited previously, only the seat mount arrangement and optionally also a stowage mount arrangement, it is nevertheless preferred that the machine also comprise an operating seat that is carried on the machine. Such an operating seat encompasses a seat shell, a seat post that extends away from the seat shell along a seat post axis, and a counterpart mount arrangement embodied for connection to the earth working machine. The counterpart mount arrangement encompasses a counterpart mount configuration that extends along and around a counterpart mount axis, the counterpart mount configuration tapering along the counterpart mount axis so that the counterpart mount configuration can be brought into and out of mounting engagement with the seat mount arrangement preferably by insertion or removal, particularly preferably along a placement path that is collinear with the counterpart mount axis and parallel to or collinear with the mount axis. The mount axis and counterpart mount axis are thus collinear when mounting engagement is established. Because of the preferred taper of the mount arrangement and counterpart mount arrangement, the mount axis and counterpart mount axis can exhibit an axial offset as mounting engagement begins to be established, but as a result of the configurations (mount configuration and counterpart mount configuration) involved in the mounting engagement, that offset is eliminated by constrained guidance during the establishment of abutting engagement. The counterpart mount configuration is preferably a positively conical outer surface of a plug-like counterpart mount arrangement.

Because of the particular advantage imparted, as described above, by the operating seat that is detachable from the machine frame, constituting a subassembly of an earth working machine which is manipulatable and manufactured separately from the machine frame, the present invention also relates only to an operating seat for an earth working machine as described and refined above, the operating seat comprising a seat shell, a seat post that extends away from the seat shell along a seat post axis, and a coupling arrangement embodied for connection to the earth working machine. Provision is made according to the present invention that the coupling arrangement is the aforementioned counterpart mount arrangement, which encompasses a counterpart mount configuration that extends along and around a counterpart mount axis, the counterpart mount configuration tapering along the counterpart mount axis. The counterpart mount configuration is preferably embodied, at least in a region involved in mounting engagement, rotationally symmetrically with the counterpart mount axis constituting the rotational symmetry axis.

BRIEF DESCRIPTION OF THE DRAWINGS

The present invention will be explained in further detail below with reference to the appended drawings, in which.

DETAILED DESCRIPTION

Figure 1:
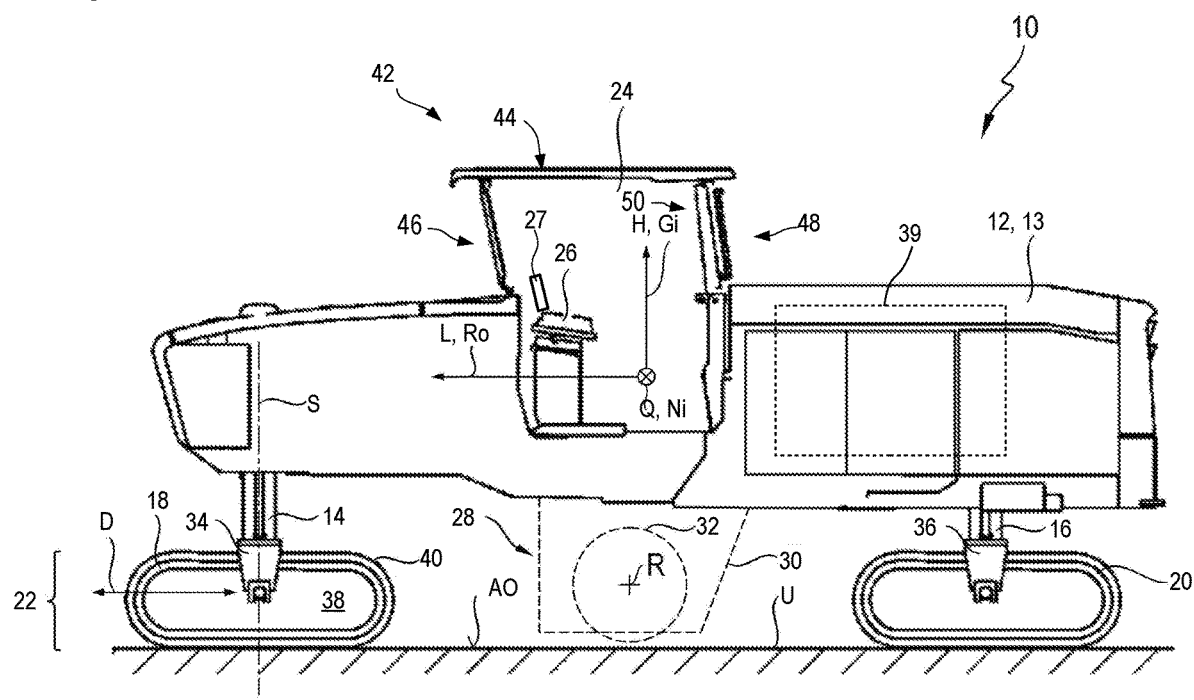
FIG. 1 is a schematic side view of an earth working machine according to the present invention in accordance with an embodiment of the present invention.

In FIG. 1, an embodiment according to the present invention of an earth working machine, in the form of a large earth milling machine or road milling machine, is designated in general as 10. It encompasses a machine frame 12 that constitutes the basic framework for a machine body 13. Machine body 13 encompasses machine frame 12 and components of machine 10 which are connected to machine frame 12 and if applicable are movable relative thereto.

Machine body 13 encompasses front lifting columns 14 and rear lifting columns 16, which are connected at one end to machine frame 12 and at another end respectively to front drive units 18 and to rear drive units 20. The distance of machine frame 12 from drive units 18 and 20 is modifiable using lifting columns 14 and 16.

Drive units 18 and 20 are depicted by way of example as crawler track units. Divergently therefrom, individual or all drive units 18 and/or 20 can also be wheel drive units. Drive units 18 and 20 may also be referred to as ground engaging units for supporting the machine frame 12 from the ground surface.

The viewer of FIG. 1 is looking at the earth working machine, or simply "machine," 10 in transverse machine direction Q that is orthogonal to the drawing plane of FIG. 1. A longitudinal machine direction orthogonal to transverse machine direction Q is labeled L, and extends parallel to the drawing plane of FIG. 1. A vertical machine direction H likewise extends parallel to the drawing plane of FIG. 1 and orthogonally to longitudinal and transverse machine directions L and Q. The arrowhead of longitudinal machine direction L in FIG. 1 points in a forward direction. Vertical machine direction H extends parallel to yaw axis Gi of machine 10, longitudinal machine direction L extends parallel to roll axis Ro, and transverse machine direction Q extends parallel to pitch axis Ni.

Earth working machine 10 comprises an operator's platform 24 from which a machine operator can control machine 10 via an operating console 26. Operating console 26 comprises an information interface apparatus 27 in the form of an operating display.

Arranged below machine frame 12 is a working subassembly 28 that here constitutes, by way of example, a milling subassembly 28 having a milling drum 32 that is received in a milling drum housing 30 and is rotatable around a milling axis R extending in transverse machine direction Q, so that substrate material can thereby be removed during earth working, proceeding from supporting surface AO of substrate U, to a milling depth determined by the relative vertical position of machine frame 12. Milling drum 32 is therefore a "working apparatus" as defined in the present Application. Alternatively or additionally, milling drum 32 can be received on machine frame 12 vertically adjustably relative thereto.

The vertical adjustability of machine frame 12 by way of lifting columns 14 and 16 also serves to set the milling depth, or generally working depth, of machine 10 during earth working. Earth working machine 10 that is depicted by way of example is a large milling machine for which the arrangement of milling subassembly 28 between front and rear drive units 18 and 20 in longitudinal machine direction L is typical. Large milling machines, or earth-removing machines in general, of this kind can comprise a transport belt for transporting removed earth material away from machine 10. A transport belt that is also present in principle on machine 10 is not depicted in FIG. 1 in the interest of better clarity.

It is not apparent from the side view of FIG. 1 that machine 10 respectively comprises, in both its front end region and its rear end region, two lifting columns 14 and 16 each having a drive unit 18, 20 connected thereto. Front lifting columns 14 are each coupled to drive units 18, in a manner furthermore known per se, by means of a drive unit connecting structure 34, for example a connecting fork that fits over drive unit 18 in transverse machine direction Q. Rear lifting columns 16 are connected to their respective drive unit 20 via a drive unit connecting structure 36 constructed identically to drive unit connecting structure 34. Drive units 18 and 20 are of substantially identical construction and constitute propelling unit 22 of the machine. Drive units 18 and 20 are motor-driven, as a rule by a hydraulic motor (not depicted).

The drive energy source of machine 10 is constituted by an internal combustion engine 39 which is received on machine frame 12 and by which, in the exemplifying embodiment depicted, milling drum 32 is driven to rotate. The output of internal combustion engine 39 furthermore furnishes on machine 10 a hydraulic pressure reservoir with which hydraulic motors and hydraulic actuators on the machine are operable. Internal combustion engine 39 is thus also a source of the energy that advances machine 10.

In the example depicted, drive unit 18, having a running direction indicated by double arrow D, comprises a radially internal receiving and guidance structure 38 on which a recirculatable crawler track 40 is arranged and is guided to move peripherally.

Lifting column 14, and with it drive unit 18, is rotatable by means of a steering apparatus (not depicted in further detail) around a steering axis S. Preferably additionally but also alternatively, lifting column 16, and with it drive unit 20, can be rotatable by means of a steering apparatus around a steering axis parallel to steering axis S.

Operator's platform 24 is covered by a protective canopy structure 42 which encompasses a protective canopy 44 that is connected to machine frame 12 or machine body 13 respectively via a front panel arrangement 46 and a rear partition arrangement 48. Protective canopy 44 is arranged on machine frame 12 liftably and lowerably by means of a movement guidance system 50. Protective canopy 44 is shown in FIG. 1 in its lifted operating position in which machine 10 is ready for working operation.

Figure 2:
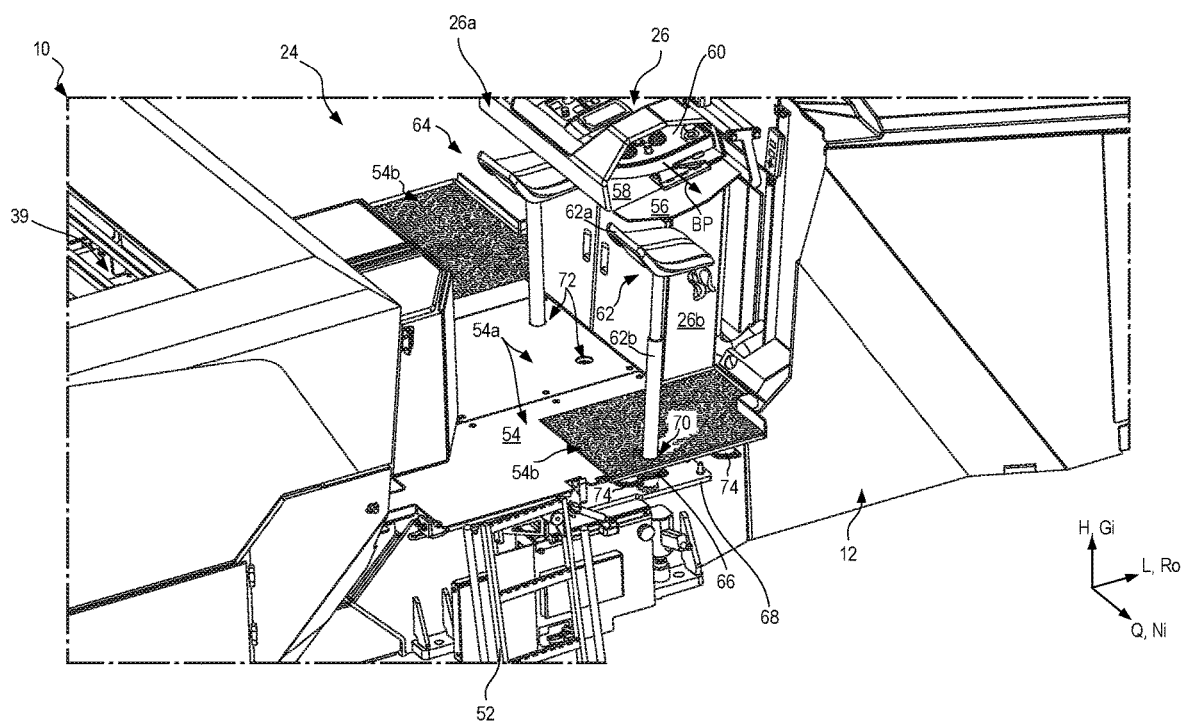
FIG. 2 is a schematic perspective view of an operating seat mount of the earth working machine of FIG. 1 from an observer's position located on the idle side of the machine, at a distance therefrom, above and behind the operating seat mount.

FIG. 2 provides a view of operator's platform 24 from an observer's position that is located along pitch axis Ni, next to the idle side, outside machine 10, and above and behind operator's platform 24. Lateral railings and panels, as well as protective canopy structure 42, have been sectioned away from operator's platform 24 in FIG. 2, so that the view of operator's platform 24 is as clear as possible. In the exemplifying depiction of FIG. 2, operator's platform 24 can be reached via a ladder 52 on the idle side of machine 10.

Operator's platform 24 encompasses an operator's platform floor 54 that can encompass rigid metal plates, for example diamond plates 54a, and/or more flexible elastomeric safety mats 54b.

Operating console 26 comprises a receiving space 58, closable by way of a lateral closure cover 56, from which an operating panel 60 can be pulled out of the inactive position shown in FIG. 2, along arrow BP, into an active position located in front of first operating seat 62.

Operator's platform 24 shows a total of two operating seats, namely the aforementioned first operating seat 62 that is in a use position, and a second operating seat 64 that is stowed in a non-use position close to the transverse center of operator's platform 24 directly behind operating console 26.

First operating seat 62 and second operating seat 64 are of identical construction, so that it is sufficient to describe only one of the two operating seats.

Operating seat 62 comprises a seat shell 62a and a seat post 62b that protrudes from seat shell 62a and is received releasably in a seat mount arrangement 66. Seat post 62b is depicted by way of example as a telescoping post that can be configured to be vertically adjustable, in a manner known per se, by means of a gas spring arranged in the interior of seat post 62b.

Seat mount arrangement 66 is fastened onto a part—in this case a plate-shaped part 68—of machine frame 12. The construction of seat mount arrangement 66 will be described below in conjunction with FIG. 3.

In order to allow seat mount arrangement 66 to be reached from operator's platform 24, operator's platform floor 54 comprises at least one seat mount opening 70 through which seat post 62b passes. A second seat mount opening (having no reference character) can be provided, similarly to seat mount opening 70, in the region of that lateral edge of machine 10 which faces toward the viewer of FIG. 2, close to the opposite lateral edge of machine 10. Seat mount opening 70 and the second seat mount opening can be arranged mirror-symmetrically around a longitudinal machine center plane parallel to roll axis Ro and to yaw axis Gi of machine. The arrangement of the seat mount openings is based substantially on the conformation of operating console and of the operating regions furnished by operating console 26 for operation thereof. If operating console 26 is constructed mirror-symmetrically with reference to a longitudinal operating-console center plane parallel to roll axis Ro and to yaw axis Gi of machine 10, it is a matter of course to arrange at least two seat mount openings mirror-symmetrically relative to the longitudinal operating-console center plane. If the longitudinal operating-console center plane coincides with the longitudinal machine center plane, the seat mount openings are preferably arranged mirror-symmetrically not only with reference to the operating console but also with reference to earth working machine 10 and to its respective longitudinal center planes.

Operator's platform floor 54 also comprises two stowage mount openings 72, in the left one of which second operating seat 64 is received. More precisely, seat post 62b of second operating seat 64 passes through left stowage mount opening 72 in the same manner as has already been explained for seat post 62b of first operating seat 62. Located below stowage mount openings 72 is a respective stowage mount arrangement that is not separately depicted. When an operating seat 62, 64 is arranged in a stowage mount opening 72, it is in a position close to operating console 26 and covered by a projecting region 26a thereof, so that the operating seat thereby stowed (in this case, second operating seat 64) does not further inconvenience or confine a machine operator working on operator's platform 24. Projecting region 26a of operating console 26 projects from an operating console body 26b toward the rear of the machine. The region in which second operating seat 64 is stowed on operator's platform 24 therefore is not, or is to only a very limited extent, part of the movement space readily reachable by a machine operator while he or she is working on the operator's platform.

Operator's platform floor 54 is vibrationally decoupled from machine frame 12 via vibration dampers 74, so that the machine operator is unaffected by vibrations that occur during operation while he or she is working on operator's platform 24. On a road milling machine as depicted by way of example in FIG. 1, milling drum 32 is the principal source of undesired vibration at operator's platform 24. Milling drum 32 comprises on its outer circumferential surface, in a manner known per se, milling bits (not depicted in the Figures) that come into impacting engagement with the hard substrate U during earth working by machine 10, at time intervals that depend on the rotation speed of milling drum 32 and on their spacing in a circumferential direction around rotation axis R of milling drum 32, in order to remove material from that substrate.

Figure 3:
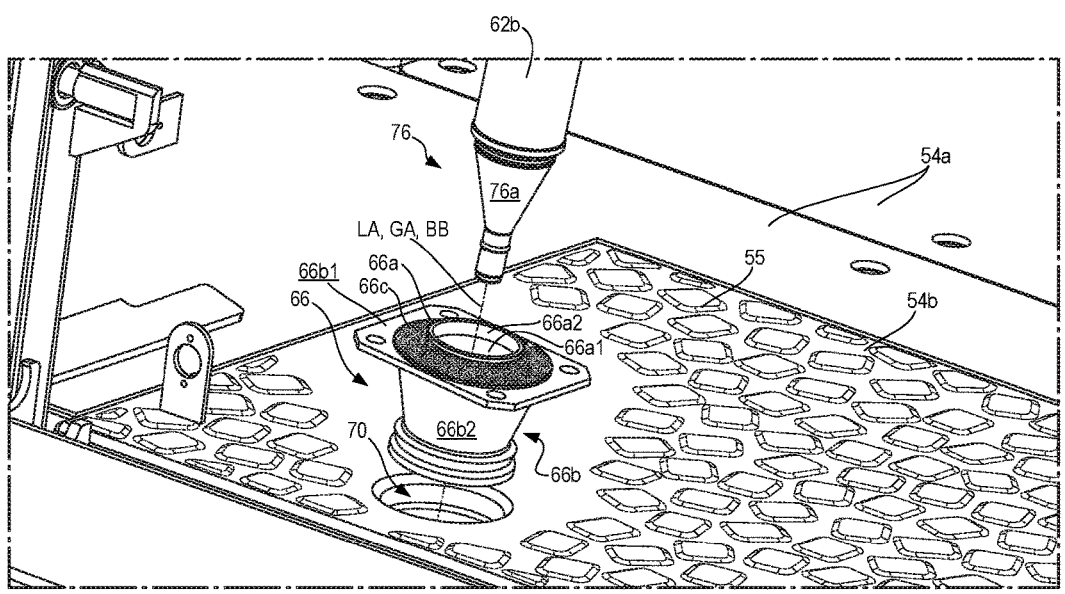
FIG. 3 is a schematic exploded perspective view of a seat mount arrangement having a counterpart mount arrangement that matches it.

FIG. 3 is an exploded view of the operating seat mount. The actual seat mount arrangement 66 located below elastomeric safety mat 54b is depicted above seat mount opening 70. For better clarity, profiled elements 55 of elastomeric safety mat 54b in the vicinity of seat mount arrangement 66 are omitted even though they are in fact present.

Seat mount arrangement 66 has, with reference to a mount axis LA, a radially inner mount arrangement 66a having a mount configuration 66a1. Mount arrangement 66a, which is preferably manufactured from steel, has on its side facing toward seat post 62b firstly a cylindrical entry configuration 66a2 that is adjoined along mount axis LA by negatively conical mount configuration 66a1. Negatively conical mount configuration 66a1 tapers in a direction away from entry configuration 66a2, i.e. its open cross section becomes smaller with axial distance from entry configuration 66a2.

Seat mount arrangement 66 furthermore comprises a fastening arrangement 66b that extends along mount axis LA over a common axial region and surrounds mount arrangement 66a continuously around it along a circumferential path. Fastening arrangement 66b is preferably also constituted from metal, for example from steel or aluminum. It encompasses a conical portion 66b2 that serves for vibration-damped coupling of fastening arrangement 66b to mount arrangement 66a, and encompasses a flange portion 66b1 that serves to fasten seat mount arrangement 66 onto machine frame 12, for example onto plate-shaped element 68 thereof.

Located between an outer side of mount arrangement 66a and an inner side of fastening arrangement 66b, in particular of conical portion 66b2 thereof, is an annular gap that is filled with an elastomeric damping arrangement 66c. Elastomeric damping arrangement 66c completely surrounds mount arrangement 66a radially externally along a circumferential path around mount axis LA, and is itself in turn completely surrounded by fastening arrangement 66b along a circumferential path around mount axis LA.

In FIG. 3, that longitudinal end of seat post 62b which is located remotely from seat shell 62a is depicted axially above seat mount arrangement 66. That end comprises a counterpart mount arrangement 76. Counterpart mount arrangement 76 can be brought releasably, without further tools, into a secure mounting engagement with seat mount arrangement 66, in which engagement operating seat 62 is received in seat mount arrangement 66 sufficiently fixedly that a machine operator sitting thereon can operate machine 10. The seat mount arrangement 66 may be referred to as a seat mount, and the mount arrangement 66a may be referred to as a seat mount receptacle configured to receive the longitudinal end of seat post 62b.

Counterpart mount arrangement 76 extends along and around a counterpart mount axis GA that is collinear with mount axis LA in FIG. 3. Counterpart mount arrangement 76 comprises a counterpart mount configuration 76a that encompasses a positively conical outer surface that tapers along counterpart mount axis GA, which is also a longitudinal center axis of seat post 62b, in a direction away from seat shell 62a. Counterpart mount configuration 76a and mount configuration 66a1 have identical taper opening angles, so that their external surfaces can come into planar abutting engagement against one another. That abutting engagement is the mounting engagement described above. Both mount configuration 66a1 and counterpart mount configuration 76a are preferably embodied rotationally symmetrically with reference to the common mount axis LA or counterpart mount axis GA. An angular orientation of operating seat 62 with respect to a rotation around counterpart mount axis GA is thus irrelevant in terms of establishing a mounting engagement between counterpart mount arrangement 76 and seat mount arrangement 66.

Operating seat 62 or 64 is thus insertable with its counterpart mount arrangement 76 into seat mount arrangement 66, along a simple straight-line motion path BB that is defined in the Figure by the collinear arrangement axes LA and GA, in order to establish a mounting engagement. The mounting engagement is released by pulling counterpart mount arrangement 76 in an opposite direction out of seat mount arrangement 66.

If several possible locations for arranging an operating seat 62 in its use position are intended for operator's platform 24, operator's platform 24 can comprise a plurality of seat mount arrangements 66 and mount openings 70 associated with them.

In some circumstances, as a result of self-locking between the socket-like mount configuration 66a1 and the plug-like counterpart mount configuration 76a during use of an operating seat 62, a brief impact against seat post 62b or against seat shell 62a may be necessary in order to release an abutting engagement. Such an impact can be executed manually without a tool, however, so that a tool is not required in order to release a mounting engagement once it has been established between seat mount arrangement 66 and counterpart mount arrangement 76.

A stowage mount arrangement below a stowage opening 72 can be embodied identically to the seat mount arrangement. It does not, however, comprise a damping arrangement 66c. The stowage mount arrangement can therefore be a simple short rod that comprises at its one longitudinal end a recess corresponding to mount configuration 66a1. The stowage mount arrangement may be referred to as a stowage mount including a stowage mount receptacle configured to receive the longitudinal end of seat post 62b.

A further advantage of the insertable operating seat 62, 64 presented in the present Application is that an edge region of operator's platform 24 from which an operating seat has been removed can be shortened along pitch axis Ni during non-use or during transport of earth working machine 10, for example because lateral edge regions of operator's platform 24 can be embodied to be foldable and/or slidable in toward the transverse center of the machine.

The invention claimed is:

1. An earth working machine, comprising:
   a propelling unit;
   a machine frame carried by the propelling unit;
   a working apparatus supported from the machine frame for earth working;
   an operator's platform provided on the machine frame, the operator's platform including an operating console;
   a seat mount arrangement located in a region of the operator's platform, the seat mount arrangement configured to be brought into releasable mounting engagement with a counterpart mount arrangement of an operating seat; and
   a stowage mount arrangement located in the region of the operator's platform and configured to be brought into releasable mounting engagement with the counterpart mount arrangement of the operating seat, the stowage mount arrangement being located below a projecting region of the operating console so that when the operating seat is engaged with the stowage mount arrangement the operating seat is covered by the projecting region of the operating console.

2. The earth working machine of claim 1, wherein:
   the seat mount arrangement includes a mount arrangement having a mount configuration configured for mounting engagement with a counterpart mount configuration of the operating seat, the mount arrangement being connected to the machine frame movably relative to the machine frame, with interposition of a damping arrangement.

3. The earth working machine of claim 2, wherein:
   the seat mount arrangement further includes a fastening arrangement fastened onto the machine frame; and
   the damping arrangement is included in the seat mount arrangement and connects the mount arrangement to the fastening arrangement such that the mount arrangement is movable relative to the fastening arrangement.

4. The earth working machine of claim 2, wherein:
   the mount configuration extends along and around a virtual mount axis, and the mount configuration tapers along the virtual mount axis.

5. The earth working machine of claim 4, wherein:
   the mount configuration conically tapers along the virtual mount axis.

6. The earth working machine of claim 1, wherein:
   the stowage mount arrangement includes a stowage arrangement having a stowage configuration configured for mounting engagement with a counterpart mounting configuration of the operating seat.

7. The earth working machine of claim 6, wherein:
   the stowage arrangement is rigidly connected to the machine frame.

8. The earth working machine of claim 6, wherein:
   the seat mount arrangement includes a mount arrangement having a mount configuration configured for mounting engagement with the counterpart mounting configuration of the operating seat; and
   the stowage configuration and the mount configuration each comprise a configuration portion of identical conformation configured for mounting engagement with the counterpart mounting configuration of the operating seat.

9. The earth working machine of claim 1, further comprising:
   the seat mount arrangement including a mount arrangement having a mount configuration configured for mounting engagement with a counterpart mount configuration of the operating seat, the mount arrangement being connected to the machine frame movably relative to the machine frame, with interposition of a damping arrangement;
   the operator's platform including an operator's platform floor, and a damping structure interposed between the operator's platform floor and the machine frame so that the operator's platform floor is vibrationally decoupled from the machine frame; and
   the operator's platform floor including a seat mount opening passing through the operator's platform floor, the mount configuration being reachable from the operator's platform through the seat mount opening.

10. The earth working machine of claim 9, wherein:
    the stowage mount arrangement includes a stowage arrangement having a stowage configuration configured for mounting engagement with the counterpart mounting configuration of the operating seat; and
    the operator's platform floor includes a stowage mount opening passing through the operator's platform floor, the stowage configuration being reachable from the operator's platform through the stowage mount opening.

11. The earth working machine of claim 1, further comprising:
    the operating seat, wherein the operating seat includes a seat shell, a seat post extending away from the seat shell along a seat post axis, and the counterpart mount arrangement configured for connection to the earth working machine;
    wherein the counterpart mount arrangement includes a counterpart mount configuration extending along and around a counterpart mount axis, the counterpart mount configuration tapering along the counterpart mount axis so that the counterpart mount configuration can be brought into and out of mounting engagement with the seat mount arrangement.

12. The earth working machine of claim 11, wherein:
    the counterpart mount configuration is configured such that the counterpart mount configuration can be brought into and out of mounting engagement with the seat mount arrangement by insertion and removal, respectively.

13. The earth working machine of claim 11, wherein:
    the mount configuration extends along and around a virtual mount axis; and
    the counterpart mount configuration is configured such that the counterpart mount configuration can be brought into and out of mounting engagement with the seat mount arrangement by insertion and removal, respectively, along a placement path collinear with the counterpart mount axis and parallel or collinear with the virtual mount axis.

14. An earth working machine, comprising:
    a machine frame;
    a plurality of ground engaging units for supporting the machine frame from a ground surface;
    a working apparatus supported from the machine frame for earth working;

an operator's platform provided on the machine frame, the operator's platform including an operator's platform floor;

an operator's seat including a seat post having a post end;

a seat mount connected to the machine frame below the operator's platform floor and including a seat mount receptacle configured to receive the post end;

a stowage mount connected to the machine frame below the operator's platform floor and including a stowage mount receptacle configured to receive the post end; and the operator's platform floor including a seat mount opening above the seat mount and a stowage mount opening above the stowage mount, the seat mount opening and the stowage mount opening being configured to allow passage of the seat post therethrough for engagement with the seat mount receptacle or the stowage mount receptacle located below the operator's platform floor, respectively, such that the seat post is not attached to the operator's platform floor.

15. The earth working machine of claim 14, further comprising:

a seat mount damping element located between the seat mount and the machine frame; and wherein the stowage mount is fixed to the machine frame.

16. The earth working machine of claim 14, wherein:

the post end includes a tapered portion.

17. The earth working machine of claim 14, wherein:

the post end is configured for releasable engagement with the seat mount receptacle or the stowage mount receptacle.

18. The earth working machine of claim 14, further comprising:

a plurality of damping elements between the operator's platform and the machine frame.

19. The earth working machine of claim 14, wherein:

the post end, the seat mount and the stowage mount are configured so that the post end can be brought into and out of mounting engagement with either the seat mount or the stowage mount by insertion and removal along a linear path.

* * * * *